(12) United States Patent
Zheng (10) Patent No.: US 10,330,906 B2
(45) Date of Patent: Jun. 25, 2019

(54) IMAGING ASSEMBLIES WITH RAPID SAMPLE AUTO-FOCUSING

(71) Applicant: University of Connecticut, Farmington, CT (US)

(72) Inventor: Guoan Zheng, Vernon, CT (US)

(73) Assignee: University of Connecticut, Farmington, CT (US)

(*) Notice: Subject to any disclaimer, the term of this patent is extended or adjusted under 35 U.S.C. 154(b) by 238 days.

(21) Appl. No.: 15/221,374

(22) Filed: Jul. 27, 2016

(65) Prior Publication Data

US 2017/0031146 A1 Feb. 2, 2017

Related U.S. Application Data (60) Provisional application No. 62/197,283, filed on Jul. 27, 2015.

(51) Int. Cl.
*H04N 5/247* (2006.01)
*G02B 21/00* (2006.01)
(Continued)

(52) U.S. Cl.
CPC .......... *G02B 21/0084* (2013.01); *G02B 21/20* (2013.01); *G02B 21/361* (2013.01);
(Continued)

(58) Field of Classification Search
CPC .. G02B 21/0084; G02B 21/20; G02B 21/361; G02B 21/362; G02B 21/367;
(Continued)

(56) References Cited

U.S. PATENT DOCUMENTS 4,262,988 A 4/1981 Ishibai et al.
4,625,103 A 11/1986 Kitamura et al.
(Continued)

FOREIGN PATENT DOCUMENTS

WO WO 2014/016839 1/2014
WO PCT/US2016/044312 7/2016

OTHER PUBLICATIONS

PCT International Search Report and Written Opinion for PCT/US2016/044312 dated Oct. 7, 2016.
U.S. Appl. No. 62/197,283, filed Jul. 27, 2015.

*Primary Examiner* — William C Vaughn, Jr.
*Assistant Examiner* — Jae N Noh
(74) *Attorney, Agent, or Firm* — McCarter & English, LLP (57) ABSTRACT

Advantageous instruments, assemblies and methods are provided for undertaking imaging techniques (e.g., microscopic imaging techniques). The present disclosure provides improved imaging techniques, equipment and systems. More particularly, the present disclosure provides advantageous microscopy/imaging assemblies with rapid sample auto-focusing (e.g., microscopy/imaging assemblies having instant focusing for rapid sample imaging with auto-focusing). The present disclosure provides for high-throughput whole slide imaging with instant focal plane detection. A whole slide imaging platform/assembly that uses instant focusing systems/methods for high-speed sample autofocusing is provided. Such exemplary platforms/assemblies can be used for digital pathology or the like, and can provide improved, faster and cheaper diagnosis/prognosis of ailments/diseases. At least two exemplary rapid-focus systems for whole slide imaging are provided, a first system including two pinhole-modulated cameras mounted on the eyepiece ports of a microscope platform/assembly, and a second (Continued)

system including one pinhole-modulated camera mounted on the epi-illumination arm for auto-focusing.

18 Claims, 9 Drawing Sheets

(51) Int. Cl.
  *H04N 5/225* (2006.01)
  *H04N 5/232* (2006.01)
  *G02B 21/36* (2006.01)
  *G02B 21/20* (2006.01)
(52) U.S. Cl.
  CPC ......... *G02B 21/362* (2013.01); *G02B 21/367* (2013.01); *H04N 5/2252* (2013.01); *H04N 5/2256* (2013.01); *H04N 5/2258* (2013.01); *H04N 5/23212* (2013.01); *H04N 5/247* (2013.01)

(58) Field of Classification Search
  CPC .. H04N 5/2252; H04N 5/2256; H04N 5/2258; H04N 5/23212; H04N 5/247
  USPC .......................................................... 348/80
  See application file for complete search history.

(56) References Cited

U.S. PATENT DOCUMENTS

| | | | |
|---|---|---|---|
| 6,607,888 B2* | 8/2003 | Schwartz | C12Q 1/6869 435/6.14 |
| 8,848,199 B2* | 9/2014 | Choi | G01N 21/45 356/497 |
| 2011/0315851 A1 | 12/2011 | Kishima et al. | |
| 2015/0005032 A1 | 1/2015 | Fletcher et al. | |
| 2015/0212012 A1* | 7/2015 | Barak | G02B 21/0016 702/182 |

* cited by examiner

IMAGING ASSEMBLIES WITH RAPID SAMPLE AUTO-FOCUSING

CROSS-REFERENCE TO RELATED APPLICATIONS

This application claims priority to Provisional Application Ser. No. 62/197,283 entitled "Auto-Focus System For Whole Slide Imaging" which was filed Jul. 27, 2015, the contents of which is hereby incorporated by reference in its entirety.

FIELD OF THE DISCLOSURE

The present disclosure relates generally to the field of imaging techniques, equipment and systems and, more particularly, to microscopy/imaging assemblies with rapid sample auto-focusing (e.g., microscopy/imaging assemblies having instant focusing for rapid sample imaging with auto-focusing).

BACKGROUND OF THE DISCLOSURE

In general, a whole slide imaging ("WSI") system can be an important tool for biomedical research and clinical diagnosis. In particular, advances of computer and image sensor technologies have accelerated the development of WSI systems for high-content screening, telemedicine, and digital pathology. An important aspect of WSI systems is to maintain the sample at the optimal focal position over a large field of view. In general, developing an auto-focus method for high-throughput WSI systems remains an active research area due to the potentials in industrial and clinical applications.

There are at least two general types of autofocus methods in WSI systems: 1) laser reflection based methods and 2) image contrast based methods. For laser reflection based methods, an infrared laser beam is reflected by the glass surface and creates a reference point to determine the distance between the glass surface and the objective lens. This method works well for a sample that has a fixed distance off the glass surface. If a sample varies its location from the surface, this method can fail to maintain the optical focal position. Different from the laser autofocusing method, the image contrast based methods generally track sample topography variations and identify the optimal focal position through image processing. This method acquires multiple images by moving the sample along the z direction and attempts to calculate the optimal focal position by maximizing a figure of merit of the acquired images. Typical figure of merits include image contrast, resolution, entropy and frequency content of the images. Since z-stacking increases the total scanning time, the image-based autofocus method can achieve improved imaging performance by trading off system throughput. However, due to the topographical variation of pathology slides, many commercially available WSI systems employ image contrast based methods for focus tracking.

A need exists among end-users and/or manufacturers to develop microscopy/imaging assemblies that include improved features/structures. In addition, a need remains for instruments, assemblies and methods that allow imaging techniques (e.g., microscopic imaging techniques) through designs and techniques that are easily understood and implemented.

Thus, an interest exists for improved microscopy/imaging assemblies and related methods of use. These and other inefficiencies and opportunities for improvement are addressed and/or overcome by the assemblies, systems and methods of the present disclosure.

SUMMARY OF THE DISCLOSURE

According to the present disclosure, advantageous instruments, assemblies and methods are provided for undertaking imaging techniques (e.g., microscopic imaging techniques).

The present disclosure provides improved imaging techniques, equipment and systems. More particularly, the present disclosure provides advantageous microscopy/imaging assemblies with rapid sample auto-focusing (e.g., microscopy/imaging assemblies having instant focusing for rapid sample imaging with auto-focusing).

In exemplary embodiments, the present disclosure provides for high-throughput whole slide imaging with instant focal plane detection. The present disclosure provides for a whole slide imaging platform/assembly that uses instant focusing systems/methods for high-speed sample autofocusing. Such exemplary platforms/assemblies can be used for digital pathology or the like, and can provide improved, faster and cheaper diagnosis/prognosis of ailments (e.g., cancers and other diseases). Such advantages has prompted growth of digital pathology to be regarded as one of the promising fields in diagnostic medicine.

Disclosed herein is a whole slide imaging platform/assembly that incorporates a means for rapid focusing for high-speed microscope sample digital imaging with auto-focusing. Exemplary assemblies can be used to convert a pathology slide into a digital image. Based on exemplary instant focusing systems/methods, the digital image can advantageously be acquired in high speed and with low-cost instruments. The systems, assemblies and methods of the present disclosure having instant focusing are configured to save time and produce images with improved image quality. An exemplary rapid-focus system for whole slide imaging is provided, the system including pinhole-modulated cameras mounted on the eyepiece ports of a microscope platform/assembly.

The present disclosure provides for at least two ultrafast auto-focusing systems/methods for high-throughput whole slide imaging ("WSI"). In an exemplary embodiment, one can attach two pinhole-modulated cameras at the two eyepiece ports of the microscope platform/assembly. For each camera, one can use one-pinhole mask to modulate the light field (e.g., two one-pinhole masks for the two cameras). By adjusting the positions of the pinhole masks used in the two cameras, one can effectively change the sample view angles at the eyepiece ports, and as such, one can use the translation shift of the two pinhole-modulated images to identify the optimal focal position. By using a small pinhole size, the focal-plane-detection range is on the order of millimeters, at least 100 times longer than the objective's depth of field. One can also show that, by analyzing the phase correlation of the pinhole-modulated images, a user can determine whether the sample contains one thin section, folded sections, or multiple layers separated by certain distances—an important piece of information prior to a detailed z scan.

In another embodiment, one can attach one camera at the epi-illumination arm for auto-focusing. For this camera, one can insert a two-pinhole mask at the Fourier plane. Therefore, the captured image from this camera contains two copies of the sample. If the sample is placed at the in-focus position, these two copies from one image do not have a translational shift. If the sample is out-of-focus, these two copies has a translational shift. Based on this translational shift, one can recover the in-focus position of the sample.

In summary, in one embodiment, one can use two cameras for auto-focusing and each camera is modulated by a one-pinhole mask at the Fourier plane. In another embodiment, one can use one camera for auto-focusing and this camera can be modulated by a two-pinhole mask at the Fourier plane. For both embodiments, the defocus distance can be recovered without a z-scan, shortening the acquisition time for WSI. Both embodiments can be used for brightfield and fluorescence WSI.

The present disclosure provides for an imaging assembly including a first camera having a first pinhole mask positioned at a Fourier plane of the first camera, the first pinhole mask having a first pinhole; a second camera having a second pinhole mask positioned at a Fourier plane of the second camera, the second pinhole mask having a second pinhole; a microscope, the first and second cameras mounted to the microscope; wherein the first camera is configured and adapted to provide a first image of a sample of the microscope; wherein the second camera is configured and adapted to provide a second image of the sample of the microscope; and wherein identification of a translational shift of the first and second sample images allows a user to identify an in-focus position of the sample.

The present disclosure also provides for an imaging assembly wherein the identification of the in-focus position of the sample occurs without scanning the sample along the depth or z-direction of the sample. The present disclosure also provides for an imaging assembly wherein the first and second cameras are mounted to a modular housing.

The present disclosure also provides for an imaging assembly wherein the first pinhole mask is positioned at the Fourier plane of a first eyepiece adapter of the first camera, the first pinhole mask positioned between two lenses of the first eyepiece adapter; and wherein the second pinhole mask is positioned at the Fourier plane of a second eyepiece adapter of the second camera, the second pinhole mask positioned between two lenses of the second eyepiece adapter.

The present disclosure also provides for an imaging assembly wherein the in-focus position of the sample is provided through a main camera port of the microscope. The present disclosure also provides for an imaging assembly further including a first eyepiece port of the microscope, the first camera mounted to the first eyepiece port; and a second eyepiece port of the microscope, the second camera mounted to the second eyepiece port.

The present disclosure also provides for an imaging assembly wherein the position of the first pinhole is adjustable, and the adjustment of the position of the first pinhole changes a viewing angle of the sample for the first camera; and wherein the position of the second pinhole is adjustable, and the adjustment of the position of the second pinhole changes a viewing angle of the sample for the second camera.

The present disclosure also provides for an imaging method including providing a first camera having a first pinhole mask positioned at a Fourier plane of the first camera, the first pinhole mask having a first pinhole; providing a second camera having a second pinhole mask positioned at a Fourier plane of the second camera, the second pinhole mask having a second pinhole; providing a microscope; mounting the first and second cameras to the microscope; acquiring a first image of a sample of the microscope via the first camera; acquiring a second image of the sample of the microscope via the second camera; utilizing the first and second images to identify a translational shift of the first and second sample images; and utilizing the translational shift of the first and second sample images to identify an in-focus position of the sample.

The present disclosure also provides for an imaging method wherein the identification of the in-focus position of the sample occurs without scanning the sample along the depth or z-direction of the sample.

The present disclosure also provides for an imaging method wherein the first and second cameras are mounted to a modular housing. The present disclosure also provides for an imaging method wherein the first pinhole mask is positioned at the Fourier plane of a first eyepiece adapter of the first camera, the first pinhole mask positioned between two lenses of the first eyepiece adapter; and wherein the second pinhole mask is positioned at the Fourier plane of a second eyepiece adapter of the second camera, the second pinhole mask positioned between two lenses of the second eyepiece adapter.

The present disclosure also provides for an imaging method wherein the in-focus position of the sample is provided through a main camera port of the microscope. The present disclosure also provides for an imaging method further including a first eyepiece port of the microscope, the first camera mounted to the first eyepiece port; and a second eyepiece port of the microscope, the second camera mounted to the second eyepiece port.

The present disclosure also provides for an imaging method wherein the position of the first pinhole is adjustable, and the adjustment of the position of the first pinhole changes a viewing angle of the sample for the first camera; and wherein the position of the second pinhole is adjustable, and the adjustment of the position of the second pinhole changes a viewing angle of the sample for the second camera.

The present disclosure also provides for an imaging assembly including a camera having a pinhole mask positioned at a Fourier plane of the camera, the pinhole mask having a first pinhole and a second pinhole; a microscope, the camera mounted to the microscope; wherein the camera is configured and adapted to provide an image of a sample of the microscope, the image including two image copies of the sample; and wherein identification of a translational shift of the two image copies allows a user to identify an in-focus position of the sample.

The present disclosure also provides for an imaging assembly wherein the identification of the in-focus position of the sample occurs without scanning the sample along the depth or z-direction of the sample.

The present disclosure also provides for an imaging assembly wherein the in-focus position of the sample is provided through a main camera port of the microscope. The present disclosure also provides for an imaging assembly wherein the camera is mounted to an epi-illumination arm of the microscope.

The present disclosure also provides for an imaging method including providing a camera having a pinhole mask positioned at a Fourier plane of the camera, the pinhole mask having a first pinhole and a second pinhole; providing a microscope; mounting the camera to the microscope; acquiring an image of a sample of the microscope via the camera, the image including two image copies of the sample; utilizing the image to identify a translational shift of the two image copies; and utilizing the translational shift of the two image copies to identify an in-focus position of the sample.

The present disclosure also provides for an imaging method wherein the identification of the in-focus position of the sample occurs without scanning the sample along the depth or z-direction of the sample; wherein the in-focus position of the sample is provided through a main camera port of the microscope; and wherein the camera is mounted to an epi-illumination arm of the microscope.

Any combination or permutation of embodiments is envisioned. Additional advantageous features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIGS. 1A-1D show two pinhole-modulated cameras for instant focal plane detection; FIGS. 1B1-1B3 show a schematic of the proposed autofocusing scheme; the translational shift of the images can be used to identify the optimal focal position of the sample; FIGS. 1C1-1C3 show an off-axis pinhole being inserted to the Fourier plane of the reduction lens in the eyepiece adapter; the pinhole can be punched by a needle on a paper; a 3D-printed plastic case can be used to assemble the autofocusing module; FIG. 1D shows an exemplary autofocusing module attached at the eyepiece ports of a microscope;

FIGS. 2A1-2D show the relationship between the translational shift of the pinhole-modulated cameras and the defocus distance; FIGS. 2A1-2B3 show the captured images through the pinhole-modulated cameras; FIGS. 2C1-2C3 show the corresponding high-resolution images captured through the main camera port of the microscope as a comparison; FIG. 2D shows the relationship between the translational shift and the defocus distance;

FIG. 4 shows utilizing the phase correlation curve for exploring sample structures along the z direction; a sample with one thin section is shown in FIGS. 4A1-4A4, a sample with a folded section is shown in FIGS. 4B1-4B4, and a sample with two different layers separated by a certain distance is shown in FIGS. 4C1-4C4;

FIGS. 5A-5B2 show sample loading and mechanical scanning schemes; FIGS. 5B1 and 5B2 show a sample scanning using a mechanical kit and sample loading using a programmable robotic arm; XM: x-axis motor; YM: y-axis motor; XYG: x-y scanning gear group; ZM: z-axis motor; ZG: z-axis scanning gear;

FIGS. 6A1-6B4 show gigapixel images captured by using the exemplary platform/assembly; FIGS. 6A1-6A4 show captured images of a pathology slide using a 9 megapixel CCD; the field of view is 14 mm by 8 mm and the acquisition time is 90 seconds; FIGS. 6B1-6B4 show captured images of a blood smear using a 1.5 megapixel color CMOS sensor; the field of view is 15 mm by 15 mm and the acquisition time is 16 minutes;

DETAILED DESCRIPTION OF DISCLOSURE

The exemplary embodiments disclosed herein are illustrative of advantageous microscopy/imaging assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary imaging assemblies/fabrication methods and associated processes/techniques of assembly and use are not to be interpreted as limiting, but merely as the basis for teaching one skilled in the art how to make and use the advantageous imaging assemblies/systems and/or alternative assemblies of the present disclosure.

Advantageous instruments, assemblies and methods are provided for undertaking imaging techniques (e.g., microscopic imaging techniques). The present disclosure provides improved imaging techniques, equipment and systems. More particularly, the present disclosure provides advantageous microscopy/imaging assemblies with rapid sample auto-focusing (e.g., microscopy/imaging assemblies having instant focusing for rapid sample imaging with auto-focusing).

In general, the present disclosure provides for high-throughput whole slide imaging with instant focal plane detection. Exemplary embodiments provide for a whole slide imaging platform/assembly that uses instant focusing systems/methods for high-speed sample auto-focusing. Such platforms/assemblies can be used for digital pathology or the like, and can provide improved, faster and cheaper diagnosis/prognosis of ailments/diseases.

The present disclosure provides for a whole slide imaging platform/assembly that incorporates a means for rapid focusing for high-speed microscope sample digital imaging with auto-focusing. In exemplary embodiments, the assemblies can be used to convert a pathology slide into a digital image, and, based on the disclosed instant focusing systems/methods, the digital image can advantageously be acquired in high speed and with low-cost instruments. Exemplary systems, assemblies and methods with instant focusing are configured to save time and produce images with improved image quality (e.g., since the different regions of the image are all in-focus). In some embodiments, a rapid-focus system for whole slide imaging is provided, the system including pinhole-modulated cameras mounted on the eyepiece ports of a microscope platform/assembly.

In certain embodiments, the exemplary system/assembly utilizes a pin-hole add-on camera to each eyepiece of a microscope to provide instant focusing (e.g., autofocusing). With the two different images for each eye, one can then calculate the optimal focal position (instead of scanning each layer) which may be needed for pathology (e.g., varied topography). This may be especially needed for whole slide imaging, in which speed is desired.

As such, exemplary embodiments provide improved, faster and therefore lower cost prediction, diagnosis, and prognosis of diseases. Current auto-focusing methods either do just one plane, or they need to scan multiple planes for every section which can be slow and time consuming (e.g., current methods selectively choose which pixels to scan—they skip).

In exemplary embodiments, the systems/assemblies of the present disclosure utilize the two images to calculate the optimal focal position so that one does not have to scan each depth (e.g., z-scanning).

The present disclosure provides for at least two ultrafast auto-focusing systems/methods for whole slide imaging ("WSI"). In an embodiment, one can attach two pinhole-modulated cameras at the two eyepiece ports of the microscope platform. For each camera, one can use one-pinhole mask to modulate the light field (e.g., two one-pinhole masks for the two cameras). By adjusting the positions of the pinhole masks used in the two cameras, one can effectively change the sample view angles at the eyepiece ports, and as such, one can use the translation shift of the two pinhole-modulated images to identify the optimal focal position.

In another embodiment, one can attach one camera at the epi-illumination arm for autofocusing. For this camera, one can insert a two-pinhole mask at the Fourier plane. Therefore, the captured image from this camera contains two copies of the sample. If the sample is placed at the in-focus position, these two copies from one image do not have a translational shift. If the sample is out-of-focus, these two copies has a translational shift. Based on this translational shift, one can recover the in-focus position of the sample.

As such, in the first disclosed embodiment, one can use two cameras for auto-focusing and each camera is modulated by a one-pinhole mask at the Fourier plane. In the second embodiment, one can use one camera for auto-focusing and this camera can be modulated by a two-pinhole mask at the Fourier plane. For both exemplary embodiments, the defocus distance can be recovered without a z-scan, shortening the acquisition time for WSI. The assemblies, systems and methods of the present disclosure can be used for brightfield and fluorescence WSI.

There are several advantages of the disclosed embodiments. First, by deploying a small-sized pinhole in the mask, auto-focusing can reach the millimeter range, at least 100 times longer than the objective's depth of field. As long as the sample is placed at the millimeter range of the focal plane, the exemplary embodiments are able to identify the optimal focal position without performing z-stacking. On the other hand, conventional contrast based methods rely on the captured images from the main camera port, which are blurred out if the sample is defocused by a long distance.

Another advantage is that the images captured by the pinhole-modulated cameras provide additional information of the sample structure in the z direction. In the first embodiment, by analyzing the phase correction curve of the two images, one can readily determine whether the sample contains one thin section, folded sections, or multiple layers separated by certain distance. Such information is valuable for cytology analysis, where samples are intrinsically 3-dimensional. Different z-sampling strategies can also be used in conjunction with the reported systems/methods for better image acquisition. For example, one can perform z-stacking for the area that contains folded sections or multiple layers. One can also avoid air burbles by comparing the layered structure with the surrounding areas.

For the first embodiment, it is noted that the two cameras do not need to be placed at the eyepiece ports. As long as one can use the lens to relay the sample plane to the detector plane, one can place these two cameras to the detector planes. For the second embodiment, it is noted that one can also use more than two pinholes in the mask to modulate the light, as long as the pinhole is placed at the edge of the system pupil.

In certain embodiments, the present disclosure provides for the development of a high-throughput whole slide imaging system/method by adapting a cost-effective opto-mechanical add-on kit/assembly to existing microscopes. One can attach two pinhole-modulated cameras at the eyepiece ports for instant focal plane detection. In order to achieve system automation, one can deploy a low-cost programmable robotic arm to perform sample loading and stepper motors to drive the microscope stage to perform x-y scanning. Using a 20× objective lens, one can acquire a 2 giga-pixel image with 14 mm by 8 mm field of view in 90 seconds. Exemplary assemblies, systems and methods may find applications in biomedical research, telemedicine, and digital pathology. They may also provide new insights for the development of high-content screening instruments.

For each x-y position, exemplary assemblies, systems and methods are able to directly move the stage to the optimal focal position; no z-stacking is needed and the focus error will not propagate to other x-y positions. In certain embodiments, one can employ a cost-effective programmable robotic arm (e.g., uArm from Kickstarter) for sample loading. One can expand its capability for handling other samples (such as a Petri dish) and integrate other image recognition strategies for better and affordable laboratory automation.

The present disclosure will be further described with respect to the following examples; however, the scope of the disclosure is not limited thereby. The following examples illustrate the advantageous imaging assemblies, systems and methods of the present disclosure.

Figure 1A:
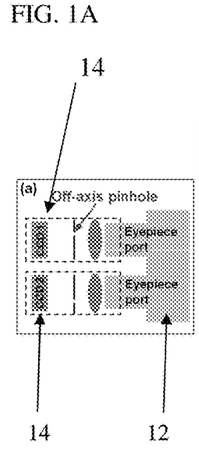
FIG. 1A shows that by adjusting the positions of the pinhole of each camera, one can effectively change the sample view angle; the optimal focal position can be recovered from the translational shift of the two corresponding images.

Example 1: Two Cameras for Auto-Focusing and Each Camera is Modulated By a One-Pinhole Mask In some embodiments, one can attach two pinhole-modulated cameras 14 at the eyepiece ports of a microscope 12 for instant focal plane detection, as shown in FIG. 1A. By adjusting the positions of each pinhole of each camera 14, one can effectively change the sample view angle for the pinhole-modulated cameras 14. When the sample of the microscope 12 is placed at the in-focus position, the two captured images from cameras 14 will be identical (FIG. 1B2). When the sample is out of focus (FIGS. 1B1 and 1B3), the sample images will be projected at two different view angles, causing a translational shift in the two images. The translation shift is proportional to the defocus distance of the sample. Therefore, by identifying the translational shift of the two captured images, one can recover the optimal focal position of the sample (e.g., the in-focus position of the sample of microscope 12) without a z-scan of the sample (e.g., without z-scanning the sample in the z-direction or along the depth of the sample).

Figures 1B, 1B, 1B, 1C, 1C, 1C, 1D:
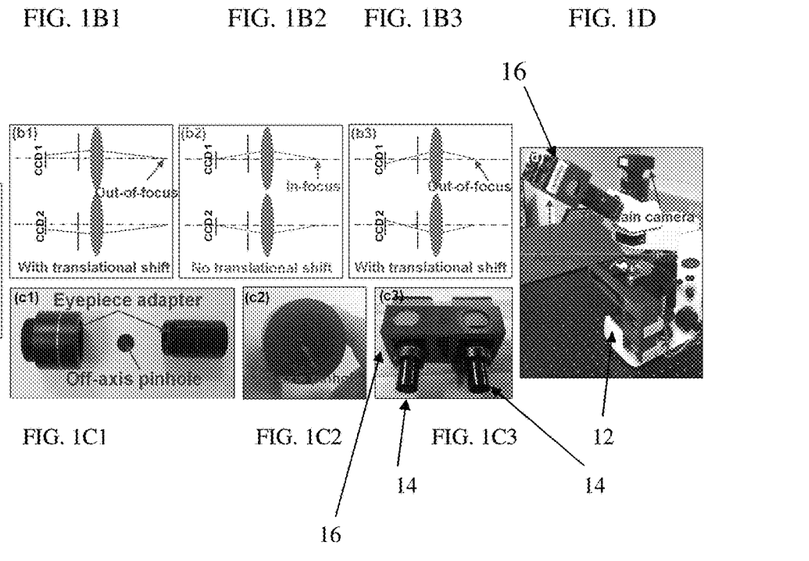

An exemplary design of an eyepiece adapter of a pinhole modulated camera 14 is shown in FIG. 1C1, where one can place the pinhole mask at the Fourier plane of the eyepiece adapter (e.g., in between two lenses—FIGS. 1A and 1C1). One can attach the two pinhole-modulated cameras 14 (via eyepiece adapters) into the eyepiece ports of a microscope 12 (e.g., an Olympus microscope 12 with a 20×, 0.75 NA objective lens) as shown in FIGS. 1A and 1D. As shown in FIG. 1C3, the two cameras 14 can be mounted to housing 16 (e.g., modular housing 16). In exemplary embodiments, housing 16 and mounted cameras 14 can be utilized in connection with a wide variety of different microscopes 12.

It is noted that the two cameras 14 do not need to be placed at the eyepiece ports. As long as one can use the lens to relay the sample plane to the detector plane, one can place these two cameras 14 to the detector planes.

FIGS. 1C1 and 1C2 show an off-axis pinhole mask being inserted to the Fourier plane of the reduction lens in the eyepiece adapter of a camera 14. The pinhole of the pinhole mask can be punched by a needle on a piece of paper or the like.

The size of each pinhole of each pinhole mask can be around 0.5 mm, and each pinhole can be located at about 1.5 mm away from the optical axis. To adjust the position of each pinhole, one can increase the off-axis distance until the image vanishes in the camera.

A 3D-printed plastic case or housing 16 can be used to assemble the auto-focusing module 16 that houses cameras 14. FIG. 1D shows the auto-focusing module 16 and cameras 14 attached at the eyepiece ports (via eyepiece adapters of cameras 14) of microscope 12.

Figure 2A:
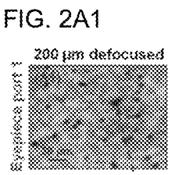
Figure 2A:
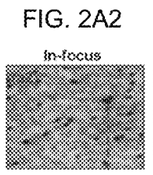
Figure 2A:
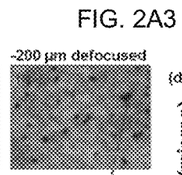
Figure 2B:
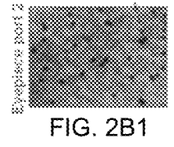
Figure 2B:
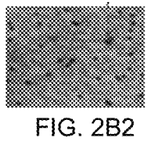
Figure 2B:
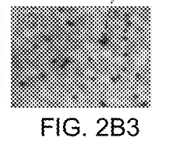
Figure 2C:
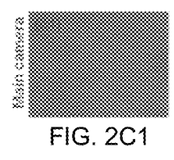
Figure 2C:
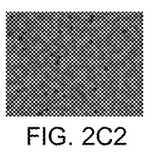
Figure 2C:
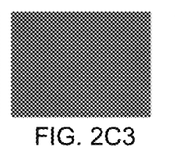
Figure 2D:
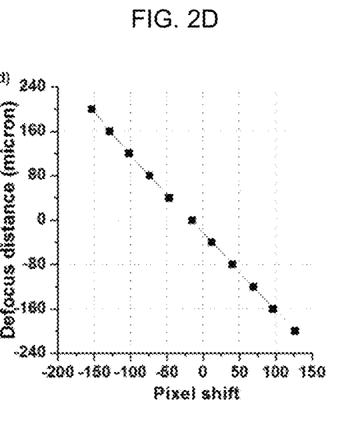

FIGS. 2A1-2D show the relationship between the translational shift of the pinhole-modulated cameras 14 and the defocus distance. FIGS. 2A1-2B3 show the captured images through the pinhole-modulated cameras 14. FIGS. 2C1-2C3 show the corresponding high-resolution images captured through the main camera port of the microscope 12 as a comparison. FIG. 2D shows the relationship between the translational shift and the defocus distance.

FIGS. 2A1-2D show the experimental characterization of the instant focal plane detection scheme. When the sample is placed at different out-of-focus positions, a translational shift is introduced at the two respective images from the pinhole-modulated cameras 14 (FIGS. 2A1 and 2B1, and FIGS. 2A3 and 2B3) at the different out-of-focus positions. The translational shift disappears, when the sample is in focus (images in FIGS. 2A2 and 2B2). By using a small size pinhole, each image captured through these two cameras 14 has a long depth of field. In FIGS. 2C1-2C3, this shows the images captured at the main camera port of microscope 12. One can see that, the depth of field of the pinhole modulated cameras 14 is orders of magnitude longer than the high-resolution image captured through the main camera port of microscope 12. FIG. 2D shows the measured relationship between the translational shift and the defocus distance of the sample. For imaging new samples, it is noted that one can first identify the translational shift of the two pinhole-modulated images and then use this calibration curve to recover the focal position of the sample.

Figure 3:
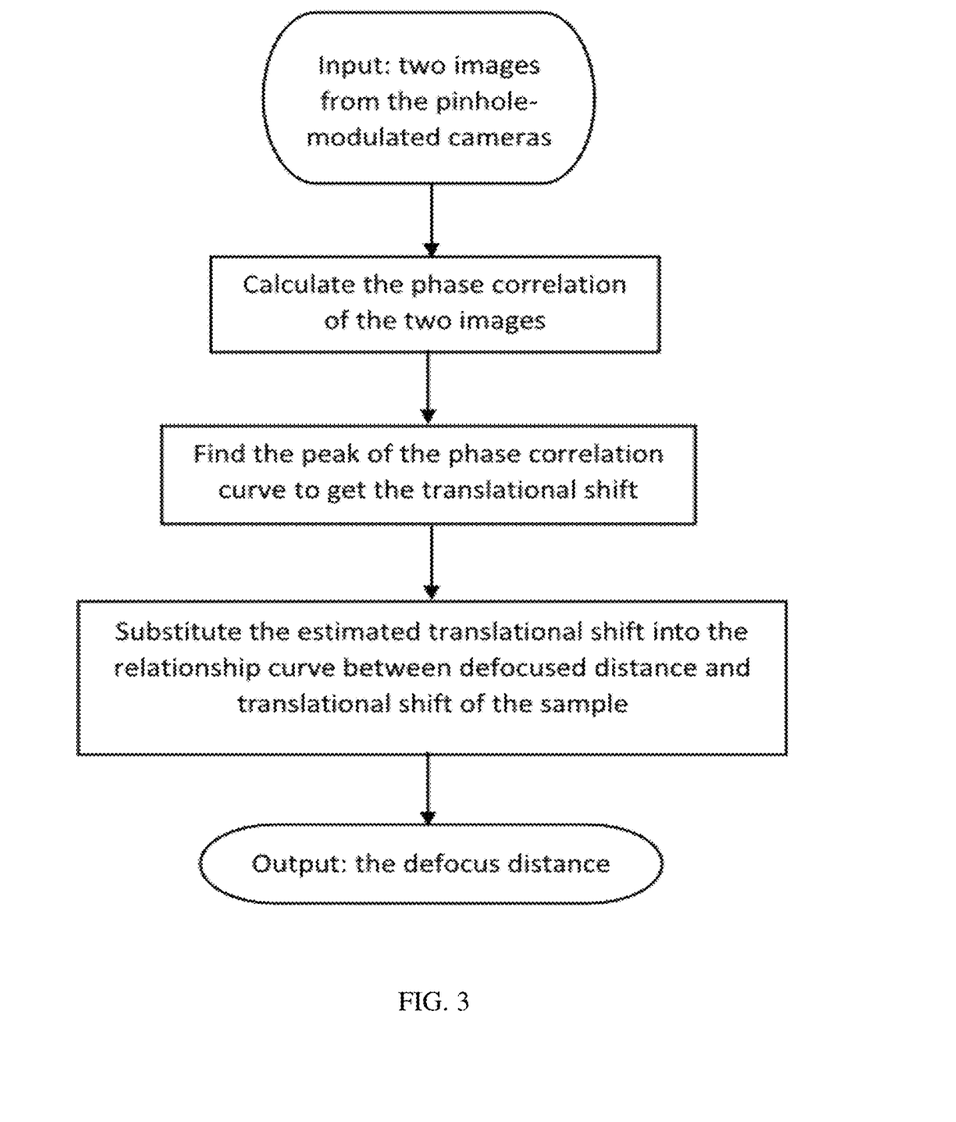
FIG. 3 shows an exemplary flow chart to recover the defocus distance of a sample.

An exemplary flow chart to recover the defocus distance of this embodiment is shown in FIG. 3.

As shown in FIG. 3, an exemplary system/method includes a first step of acquiring and inputting two images from the pinhole-modulated cameras 14. Next, the phase correlation of the two images is calculated. A next step is to find the peak of the phase correlation curve to obtain the translational shift. A next step is to substitute the estimated translational shift into the relationship curve between the defocused distance and the translational shift of the sample. The output can then be the defocus distance of the sample of microscope 12.

One can also use the phase correlation curve calculated in the flow chart of FIG. 3 to identify the translational shift of the two pinhole-modulated images. The use of phase correlation for subpixel registration is a technique in image processing. In this embodiment, we explore the use of a phase correlation curve to look at the sample's tomographic structure without a detailed z-scan of the sample, as shown in FIGS. 4A1-4C4.

Figure 4A:
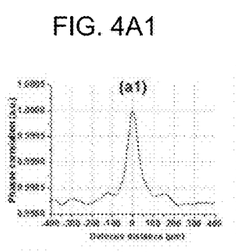
Figure 4A:
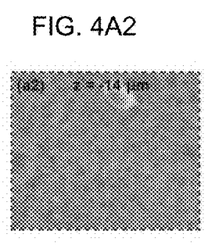
Figure 4A:
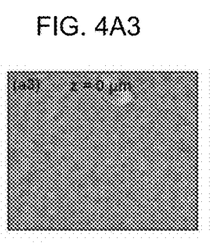
Figure 4A:
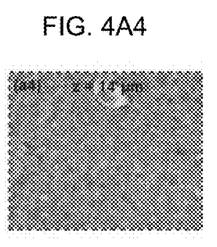
Figure 4B:
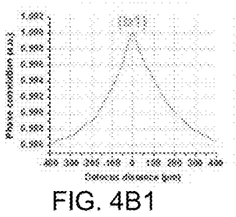
Figure 4B:
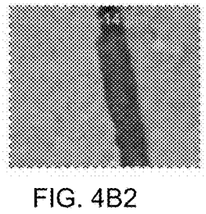
Figure 4B:
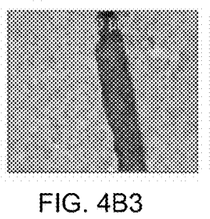
Figure 4B:
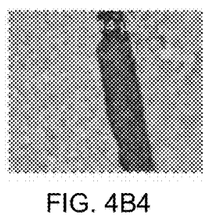
Figure 4C:
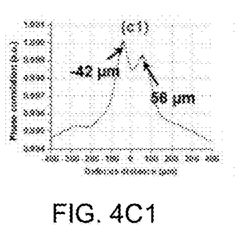
Figure 4C:
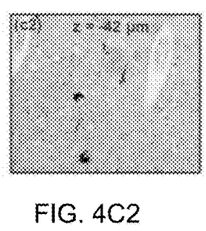
Figure 4C:
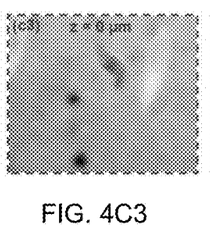
Figure 4C:
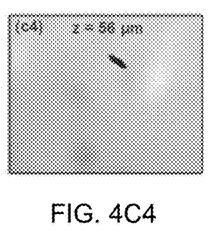

FIGS. 4A1-4C4 demonstrate that different samples have different characteristics on the phase correlation curves. A thin section renders a single sharp peak (FIG. 4A1), while a sample with folded sections has a peak with a boarder full width at half maximum (FWHM), as shown in FIG. 4B1. Lastly, a sample with two layers separated by a certain distance provides two peaks, as shown in FIG. 4C1. In particular, in FIG. 4C1, the two layers are separated by 100 µm. The exemplary assembly/platform of the present disclosure is able to recover this information over such a long depth of field. The sample information along the z direction is valuable for determining the sampling strategy. For example, one can perform multilayer sampling according to the peaks or the FWHM of the phase correlation curve. Further research may be needed to relay the phase correlation characteristics with the sample property. In this embodiment, one can simply identify the maximum point of the phase correlation curve to recover the focal position of the sample. As such, it is not required to perform z-stacking for acquiring additional information for samples with multiple layers or with folded sections.

Figure 5A:
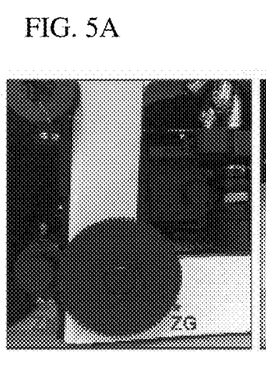
FIG. 5A shows a 3D-printed plastic gear for controlling a focus knob.
Figure 5B:
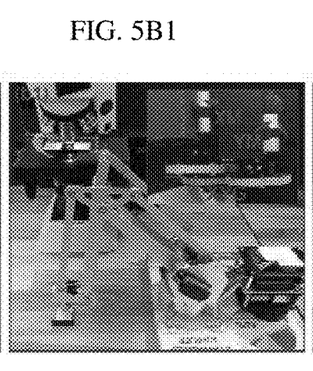
Figure 5B:
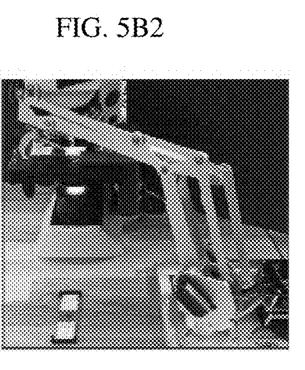

In order to achieve system automation, one can use a low-cost programmable robotic arm (e.g., uArm, Kickstarter) to perform sample loading, and one can use stepper motors (e.g., NEMA-17, Adafruit) to drive the microscope stage to perform x-y-z scanning. In an exemplary implementation, one can use 3D-printed plastic gears to control the focus knob for sample autofocusing, as shown in FIG. 5A. The smallest z-step was 350 nm, in some embodiments. If needed, one can change the size ratio of the two mechanical gears in FIG. 5A to achieve an improved z resolution. FIGS. 5B1 and 5B2 show the mechanical add-on kit for controlling sample scanning in the x-y plane and the programmable robotic arm for automatic sample loading. One can use an Arduino microcontroller to control the scanning process.

Figure 6A:
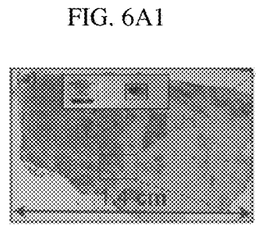
Figure 6A:
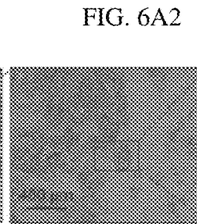
Figure 6A:
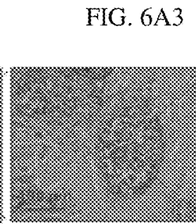
Figure 6A:
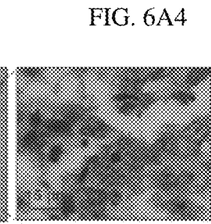
Figure 6B:
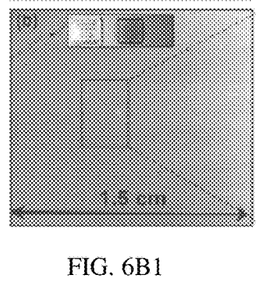
Figure 6B:
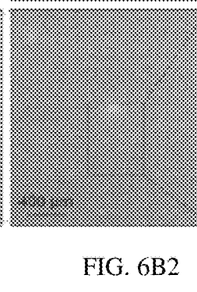
Figure 6B:
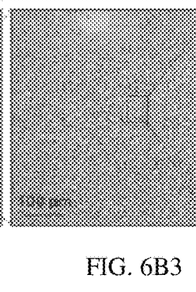
Figure 6B:
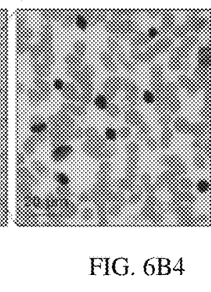

FIGS. 6A1-6B4 show gigapixel images captured using an platform/assembly. In FIG. 6A1-6A4, a 9 megapixel monochromatic CCD camera (e.g., Prosilica GT 34000, 3.69 µm pixel size) was utilized to capture a pathology slide. Using a 20×, 0.75 numerical aperture objective lens, it took 90 seconds to acquire a 2 gigapixel image with 14 mm by 8 mm field of view. This image contains 340 segments, and the image acquisition of each segment takes around 0.24 second using a regular desktop computer with an Intel i5 processor. A detailed breakdown of the acquisition time is as follow: 1) 0.1 second for the pinhole-modulated cameras 14 to acquire two images from the eyepiece ports; 2) 0.02 second for the calculation of the phase correlation and recover the optimal focal position; 3) 0.04 second to drive the focus knob; 4) 0.02 second to trigger the main camera to capture the high-resolution in-focus image; 5) 0.06 second to drive the x-y stage to another position. The main speed limitation was the data readout from the pinhole-modulated cameras. In this prototype, a camera model (e.g., 31AU03, IC Capture, 1024 by 768 pixels) was used. A CMOS webcam with faster data readout can reduce the acquisition time of a single segment to 0.16 second (around 40% improvement).

In FIGS. 6B1-6B4, a 1.5 megapixel color CMOS camera (Infinity lite, 4.2 μm pixel size) was used to acquire a color image of blood smear. The total acquisition time was 16 minutes and the field of view was 15 mm by 15 mm with 2400 segments. The longer acquisition time was caused by the detector size being much smaller than the CCD used in FIG. 6A1 and the absence of hardware triggering.

To test the autofocusing capability, one can also move the sample to 25 pre-defined z-positions and use the disclosed approach in Example 1 to recover the z-positions. The standard deviation between the ground truth and the recovery is around 300 nm, much smaller than the depth of field of the employed objective. Finally, the use of stepper motor and integrating it with the disclosed auto-focusing scheme for high throughput WSI is new and may find various biomedical applications.

In summary, the use of a pinhole-modulated camera (e.g., two cameras) for instant focal plane detection has been demonstrated. A WSI add-on kit to convert a microscope to a WSI system has been developed. For each x-y position, the reported WSI platform/assembly is able to directly move the stage to the optimal focal position; no z-stacking in needed for focal plane searching and the focus error will not be accumulated to other x-y positions. By using the reported platform, the acquisition of a 2 gigapixel image (14 mm by 8 mm) in 90 seconds was demonstrated.

Compared to laser reflection methods, the disclosed approach/assembly is able to track the topographic variations of the tissue section; neither external laser source nor angle-tracking optics is needed. Compared to image-contrast methods, the disclosed approach/assembly has an ultra-long autofocusing range and requires no z-scanning for focal plane detection.

The camera lens at the eyepiece port can be replaced by low-cost eyepiece adapter with 0.5× reduction lens (e.g., Amscope). The pinhole can be inserted into the Fourier plane of the reduction lens. Lastly, one can use a low-cost stereo Minoru webcam or other low-cost webcams at the eyepiece port to capture the pinhole-modulated images.

The rest of system can remain as a microscope (e.g., conventional microscope). The disclosed designs/assemblies may enable the dissemination of high-throughput imaging/screening instruments for the broad biomedical community. They can also be directly combined with other cost-effective imaging schemes for high-throughput multimodal microscopy imaging.

There are several areas to improve in next phases. Firstly, due to the large data set acquired, one can use a free software program (e.g., Image Composite Editor) to perform image stitching offline. One can convert the captured data into individual images and manually upload them to the software. The software blindly stitches the image without making use of positional information of individual segments. The entire process takes about 40 minutes for generating the image shown in FIG. 6A1. One can plan to develop a memory efficient program to perform stitching during the image acquisition process.

Secondly, the current speed limitation comes from the data readout from the pinhole-modulated cameras (15 fps). A camera with a higher frame rate can be used to further shorten the acquisition time by 40%. The sensor area and the total number of pixels of the pinhole-modulated camera are not important in certain embodiments.

Next, one can use plastic cases in various parts of the assembly to mount the pinhole-modulated cameras. Due to the weights of the cameras, stability may be a concern. A metal mount with improved opto-mechanical design may be utilized (for example, using the commercially available eyepiece adapter with 0.5× reduction lens).

Also, the disclosed assembly/method can be used for fluorescence imaging. In this case, the photon budget for the pinhole modulated cameras will be low. One may need to study the effect of shot noise for the phase correlation curve.

Also, the use of a phase correlation curve for looking at a sample's tomographic structure is new. Further research can be performed to further study the phase correlation characteristics and the associated sample properties.

In exemplary embodiments, one can employ a programmable robotic arm for sample loading. Low-cost and open-source robotic arms can be utilized. One can expand their capability for handling different samples and integrate other image recognition strategies for improved and affordable laboratory automation.

Figure 7:
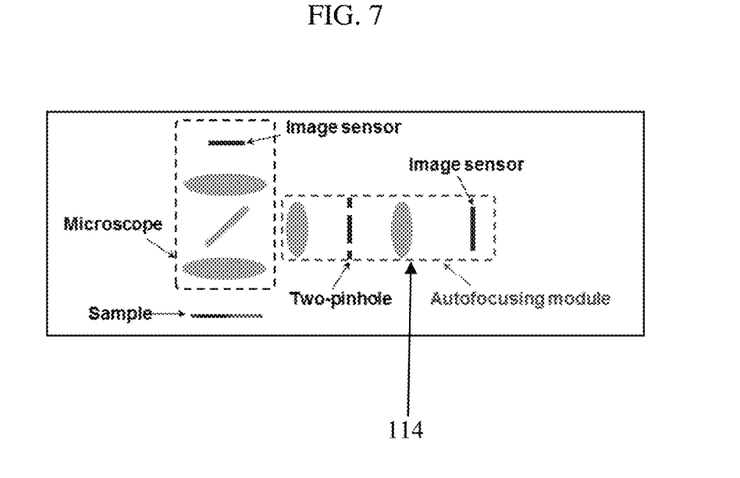
FIG. 7 shows that an exemplary camera can be used for auto-focusing and this camera can be modulated by a two-pinhole mask.

Example 2: A Camera for Auto-focusing and This Exemplary Camera is Modulated By a Two-Pinhole Mask In another embodiment and as shown in FIG. 7, one can attach one camera 114 to a microscope. Exemplary camera 114 is attached/mounted at the epi-illumination arm of the microscope for auto-focusing.

Figure 8A:
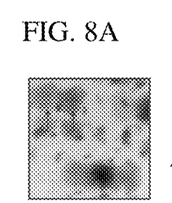
FIGS. 8A-8D show another exemplary auto-focusing assembly/method; the captured images in each of FIGS. 8A-8C each contain two copies of the sample; by identifying the lateral distance of these two copies (e.g., the distance between the two arrows in FIG. 8A), one can recover the defocus distance of the sample, as shown in FIG. 8D.
Figure 8B:
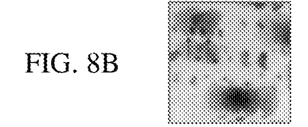
Figure 8C:
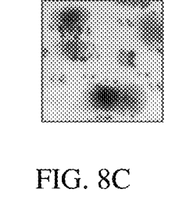
Figure 8D:
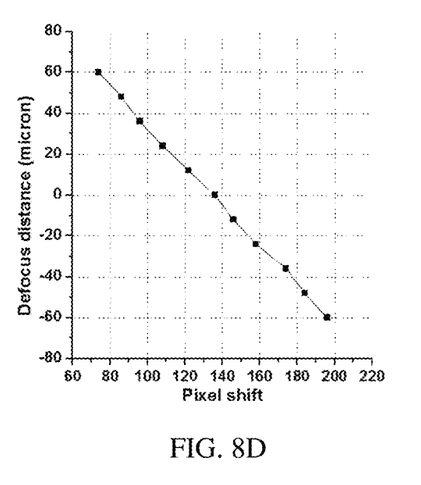

For camera 114 and as depicted in FIG. 7, one can insert a two-pinhole mask having two pinholes at the Fourier plane of camera 114 (the auto-focusing module 114). Therefore, a captured image from this camera 114 contains two image copies of the sample, as shown in FIG. 8A (and as shown in FIG. 8B; and as shown in FIG. 8C).

If the sample is placed at the in-focus position, these two copies from one image do not have a lateral distance between them. If the sample is out-of-focus (e.g., FIG. 8A), these two image copies contained in the single image has a lateral translational shift (e.g., the distance between the two arrows in FIG. 8A). Based on this lateral translational shift, one can recover the in-focus position of the sample. An exemplary flow chart to recover the defocus distance of this embodiment is shown in FIG. 9.

Figure 9:
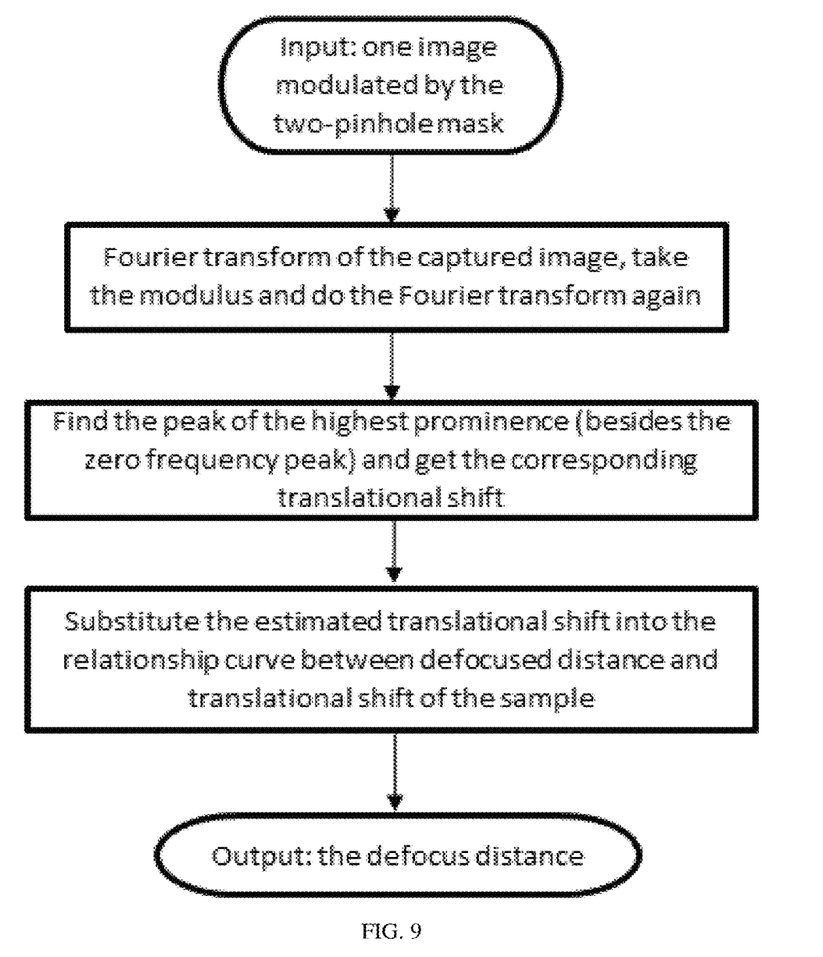
FIG. 9 shows another exemplary flow chart to recover the defocus distance of a sample.

As shown in FIG. 9, an exemplary system/method includes a first step of acquiring and inputting one image (e.g., FIG. 8A) from the two-pinhole-modulated camera 114. Next, one can find the Fourier transform of the captured/acquired image, take the modulus and do the Fourier transform again. Next, one can find the peak of the highest prominence (besides the zero frequency peak) and get the corresponding translational shift. Then, one can substitute the estimated translational shift into the relationship curve between the defocused distance and the translational shift of the sample. The output can then be the defocus distance of the sample of the microscope (e.g., FIG. 7).

One can also set an offset to the autofocusing camera 114 in FIG. 7. In this case, when the sample is in-focus, it will introduce a certain amount of lateral shift of the two copies of the captured image in FIG. 8A.

It is noted that one can also use more than two pinholes in the mask of camera 114 to modulate the light, as long as the pinhole is placed at the edge of the system pupil.

Although the systems/methods of the present disclosure have been described with reference to exemplary embodiments thereof, the present disclosure is not limited to such exemplary embodiments/implementations. Rather, the systems/methods of the present disclosure are susceptible to many implementations and applications, as will be readily apparent to persons skilled in the art from the disclosure hereof. The present disclosure expressly encompasses such modifications, enhancements and/or variations of the disclosed embodiments.

Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. An imaging assembly comprising:
a first camera having a first pinhole mask positioned at a Fourier plane of the first camera, the first pinhole mask having a first pinhole, the first pinhole in a first fixed position in the Fourier plane of the first camera;
a second camera having a second pinhole mask positioned at a Fourier plane of the second camera, the second pinhole mask having a second pinhole, the second pinhole in a second fixed position in the Fourier plane of the second camera;
a microscope, the first and second cameras mounted to the microscope;
wherein the first camera is configured and adapted to provide a first brightfield image of a sample of the microscope with the first pinhole in the first fixed position in the Fourier plane of the first camera;
wherein the second camera is configured and adapted to provide a second brightfield image of the sample of the microscope with the second pinhole in the second fixed position in the Fourier plane of the second camera;
wherein identification of a translational shift of the first and second brightfield sample images allows a user to identify an in-focus position of the sample; and
wherein the identification of the in-focus position of the sample occurs without scanning the sample along the depth or z-direction of the sample.

2. The assembly of claim 1, wherein the in-focus position of the sample can be utilized by the user for brightfield or fluorescence whole slide imaging of the sample.

3. The assembly of claim 1, wherein the first and second cameras are mounted to a modular housing.

4. The assembly of claim 1, wherein the first pinhole mask is positioned at the Fourier plane of a first eyepiece adapter of the first camera, the first pinhole mask positioned between two lenses of the first eyepiece adapter; and
wherein the second pinhole mask is positioned at the Fourier plane of a second eyepiece adapter of the second camera, the second pinhole mask positioned between two lenses of the second eyepiece adapter.

5. The assembly of claim 1, wherein the in-focus position of the sample is provided through a main camera port of the microscope.

6. The assembly of claim 1 further comprising a first eyepiece port of the microscope, the first camera mounted to the first eyepiece port; and
a second eyepiece port of the microscope, the second camera mounted to the second eyepiece port.

7. An imaging method comprising:
providing a first camera having a first pinhole mask positioned at a Fourier plane of the first camera, the first pinhole mask having a first pinhole, the first pinhole in a first fixed position in the Fourier plane of the first camera;
providing a second camera having a second pinhole mask positioned at a Fourier plane of the second camera, the second pinhole mask having a second pinhole, the second pinhole in a second fixed position in the Fourier plane of the second camera;
providing a microscope;
mounting the first and second cameras to the microscope;
acquiring a first brightfield image of a sample of the microscope via the first camera with the first pinhole in the first fixed position in the Fourier plane of the first camera;
acquiring a second brightfield image of the sample of the microscope via the second camera with the second pinhole in the second fixed position in the Fourier plane of the second camera;
utilizing the first and second brightfield images to identify a translational shift of the first and second brightfield sample images;
utilizing the translational shift of the first and second brightfield sample images to identify an in-focus position of the sample; and
wherein the identification of the in-focus position of the sample occurs without scanning the sample along the depth or z-direction of the sample.

8. The method of claim 7, wherein the in-focus position of the sample can be utilized by a user for brightfield or fluorescence whole slide imaging of the sample.

9. The method of claim 7, wherein the first and second cameras are mounted to a modular housing.

10. The method of claim 7, wherein the first pinhole mask is positioned at the Fourier plane of a first eyepiece adapter of the first camera, the first pinhole mask positioned between two lenses of the first eyepiece adapter; and
wherein the second pinhole mask is positioned at the Fourier plane of a second eyepiece adapter of the second camera, the second pinhole mask positioned between two lenses of the second eyepiece adapter.

11. The method of claim 7, wherein the in-focus position of the sample is provided through a main camera port of the microscope.

12. The method of claim 7 further comprising a first eyepiece port of the microscope, the first camera mounted to the first eyepiece port; and
a second eyepiece port of the microscope, the second camera mounted to the second eyepiece port.

13. An imaging assembly comprising:
a camera having a pinhole mask positioned at a Fourier plane of the camera, the pinhole mask having a first pinhole and a second pinhole, the first pinhole in a first fixed position in the Fourier plane of the camera, and the second pinhole in a second fixed position in the Fourier plane of the camera;
a microscope, the camera mounted to the microscope;
wherein the camera is configured and adapted to provide a brightfield image of a sample of the microscope with the first pinhole in the first fixed position in the Fourier plane of the camera and the second pinhole in the second fixed position in the Fourier plane of the camera, the brightfield image including two brightfield image copies of the sample;
wherein identification of a translational shift of the two brightfield image copies allows a user to identify an in-focus position of the sample; and wherein the identification of the in-focus position of the sample occurs without scanning the sample along the depth or z-direction of the sample.

14. The assembly of claim 13, wherein the in-focus position of the sample can be utilized by the user for brightfield or fluorescence whole slide imaging of the sample.

15. The assembly of claim 13, wherein the in-focus position of the sample is provided through a main camera port of the microscope.

16. The assembly of claim 13, wherein the camera is mounted to an epi-illumination arm of the microscope.

17. An imaging method comprising:
providing a camera having a pinhole mask positioned at a Fourier plane of the camera, the pinhole mask having a first pinhole and a second pinhole, the first pinhole in a first fixed position in the Fourier plane of the camera, and the second pinhole in a second fixed position in the Fourier plane of the camera;
providing a microscope;
mounting the camera to the microscope;
acquiring a brightfield image of a sample of the microscope via the camera with the first pinhole in the first fixed position in the Fourier plane of the camera and the second pinhole in the second fixed position in the Fourier plane of the camera, the brightfield image including two brightfield image copies of the sample;
utilizing the brightfield image to identify a translational shift of the two brightfield image copies; and
utilizing the translational shift of the two brightfield image copies to identify an in-focus position of the sample; and
wherein the identification of the in-focus position of the sample occurs without scanning the sample along the depth or z-direction of the sample.

18. The method of claim 17, wherein the in-focus position of the sample can be utilized by the user for brightfield or fluorescence whole slide imaging of the sample;
wherein the in-focus position of the sample is provided through a main camera port of the microscope; and
wherein the camera is mounted to an epi-illumination arm of the microscope.

* * * * *